United States Patent [19]
Suzuki

[11] Patent Number: 5,898,525
[45] Date of Patent: Apr. 27, 1999

[54] ZOOM LENS WITH LONG BACK FOCUS

[76] Inventor: Kenzaburo Suzuki, c/o Nikon Corporation, Intellectual Property Headquarters, Fuji Bldg., 2-3, Marunouchi 3-chome, Chiyoda-ku, Tokyo, Japan

[21] Appl. No.: 09/130,743

[22] Filed: Aug. 7, 1998

[30] Foreign Application Priority Data

Aug. 18, 1997 [JP] Japan ................................. 9-236581

[51] Int. Cl.⁶ .................................................. G02B 15/14
[52] U.S. Cl. ........................ 359/684; 359/685; 359/714; 359/765
[58] Field of Search .................................. 359/676, 684, 359/685, 714, 765

[56] References Cited

U.S. PATENT DOCUMENTS

| | | | |
|---|---|---|---|
| 3,442,573 | 5/1969 | Macher | 359/684 |
| 3,922,070 | 11/1975 | Macher | 359/684 |
| 4,874,231 | 10/1989 | Aono | 359/684 |
| 5,301,064 | 4/1994 | Sugi et al. | 359/684 |
| 5,668,666 | 9/1997 | Suzuki | 359/765 |
| 5,760,968 | 6/1998 | Ohtake et al. | 359/684 |
| 5,764,420 | 6/1998 | Yahagi | 359/685 |
| 5,808,809 | 9/1998 | Yahagi | 359/684 |

Primary Examiner—Georgia Epps
Assistant Examiner—Evelyn A. Lester

[57] ABSTRACT

A high-performance zoom lens having a long back focus and thus ideally suited to electronic imaging equipment. The zoom lens comprises a first lens group G1 having positive refractive power, a second lens group G2 having negative refractive power, a third lens group G3 having negative refractive power, a fourth lens group G4 having positive refractive power, and fifth lens group G5 having positive refractive power. When zooming from the maximum wide-angle state to the maximum telephoto state, the air space between first lens group G1 and second lens group G2 increases, the air space between second lens group G2 and third lens group G3 changes linearly or non-linearly, and the air space between fourth lens group G4 and fifth lens group G5 changes linearly or non-linearly. The zoom lens preferable satisfies at least one of a number of design conditions.

15 Claims, 8 Drawing Sheets

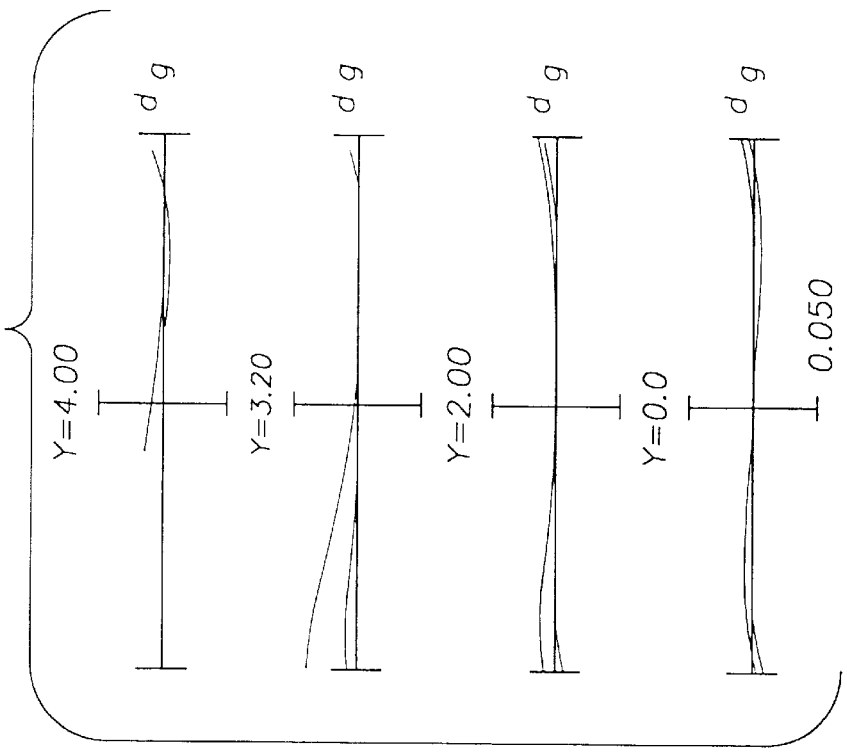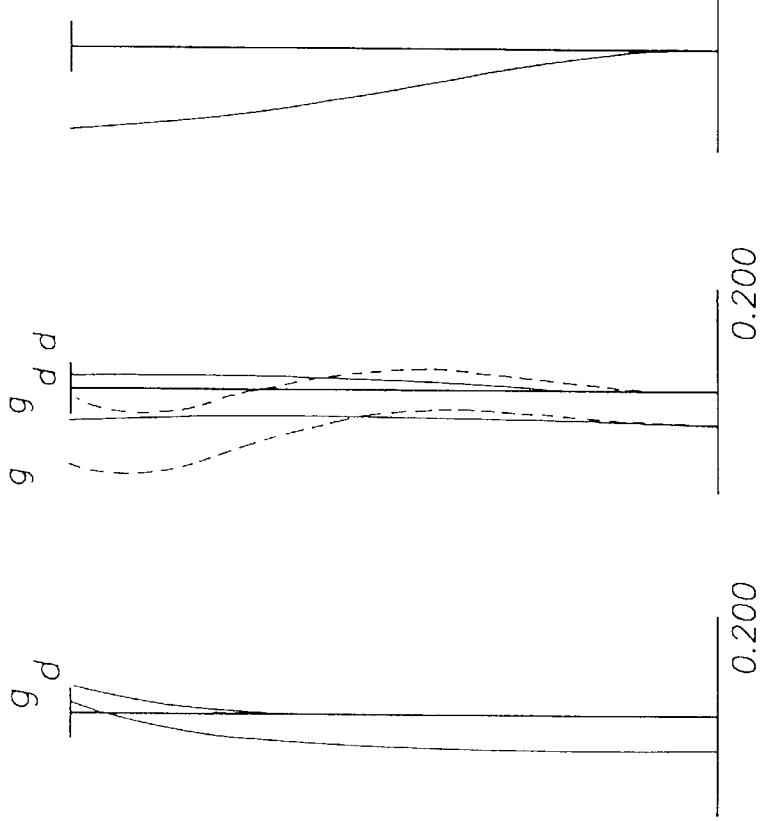

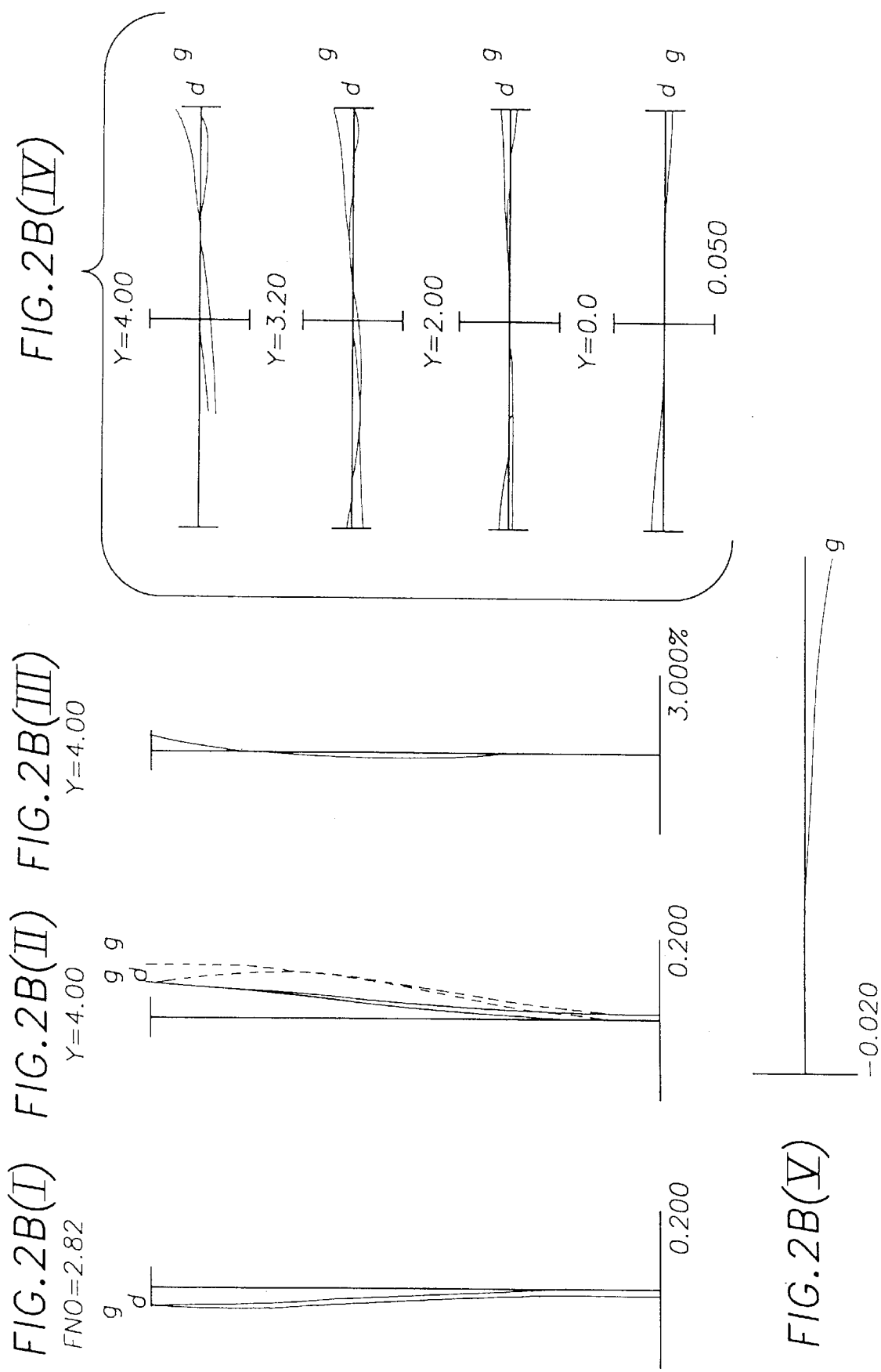

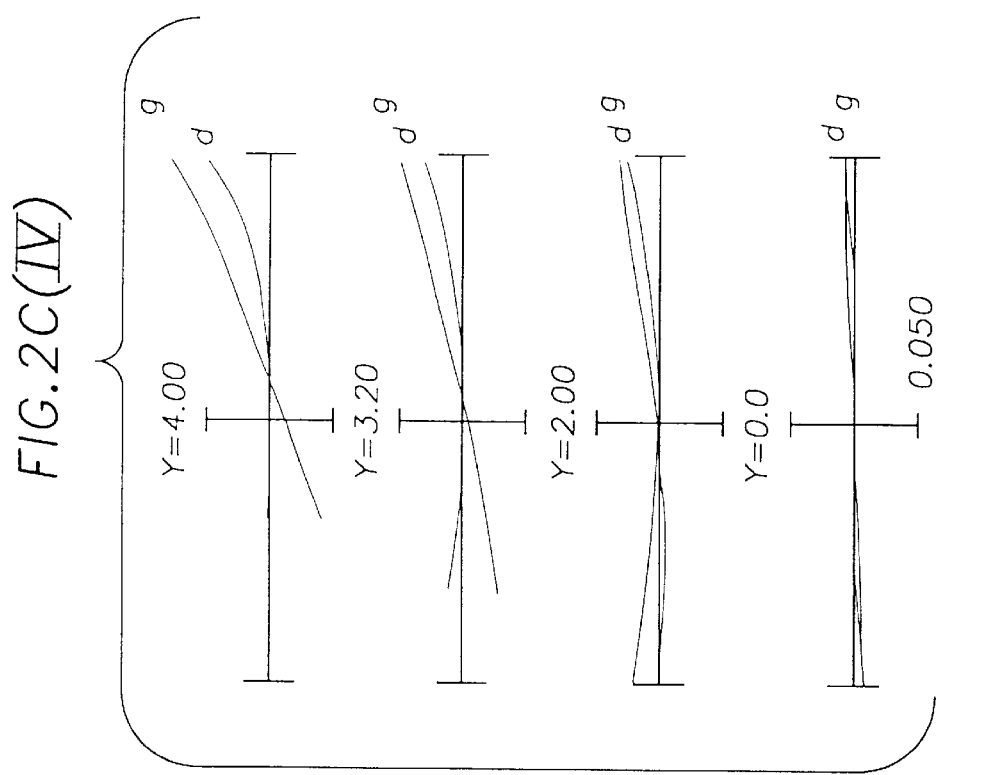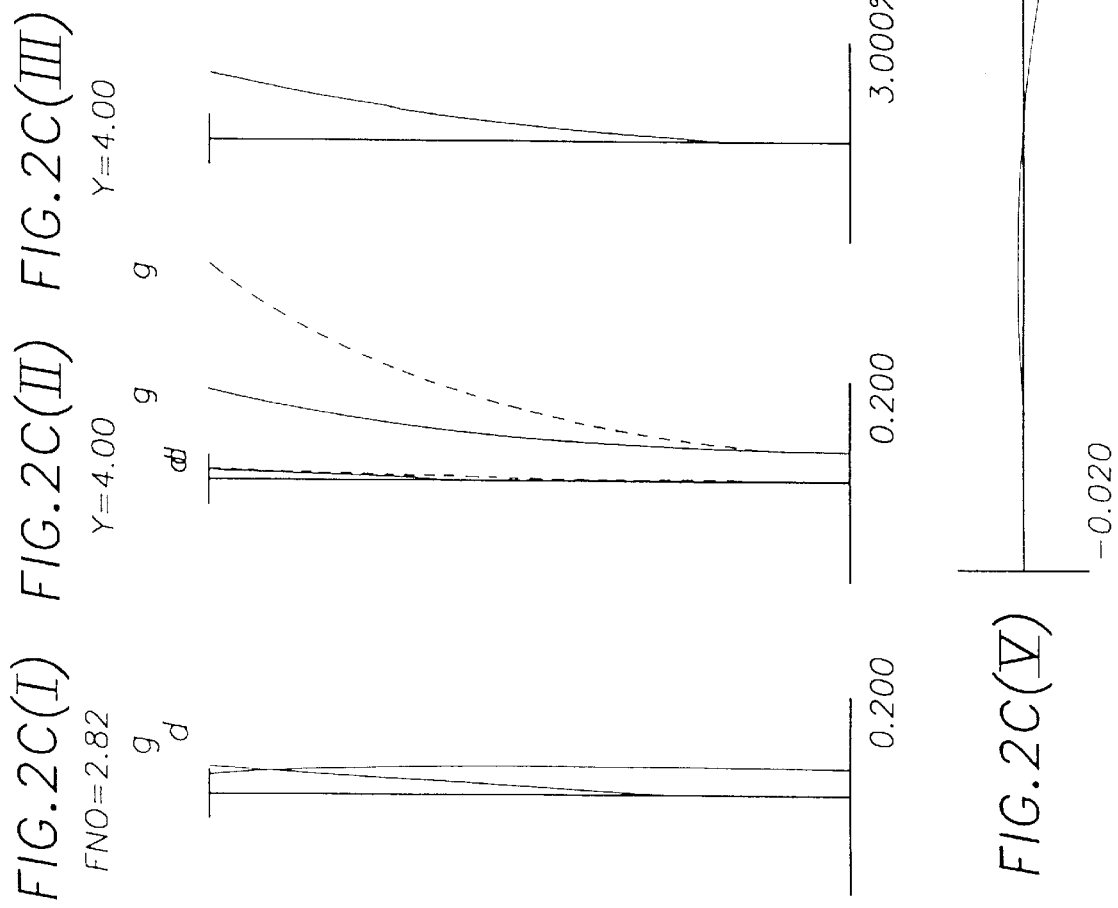

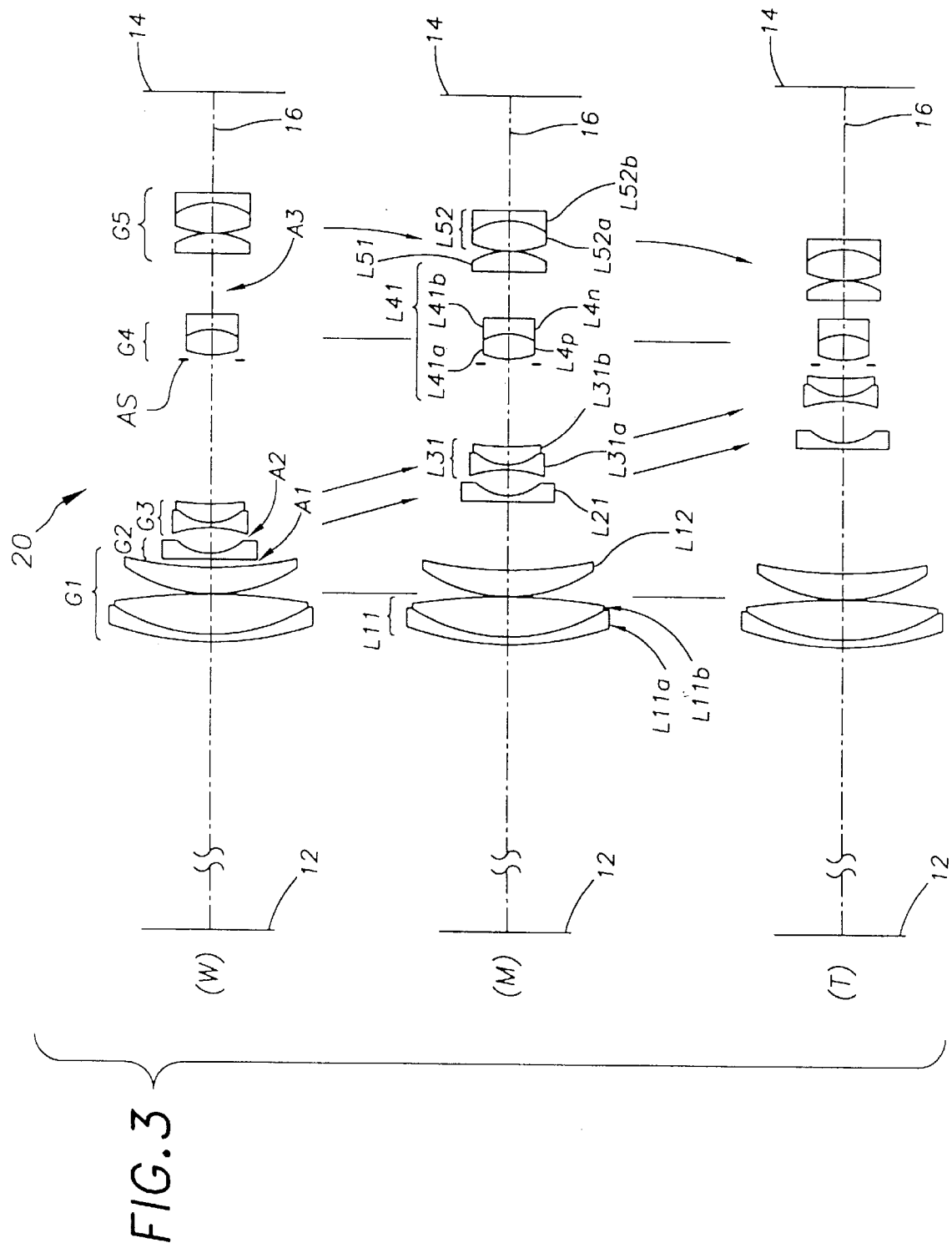

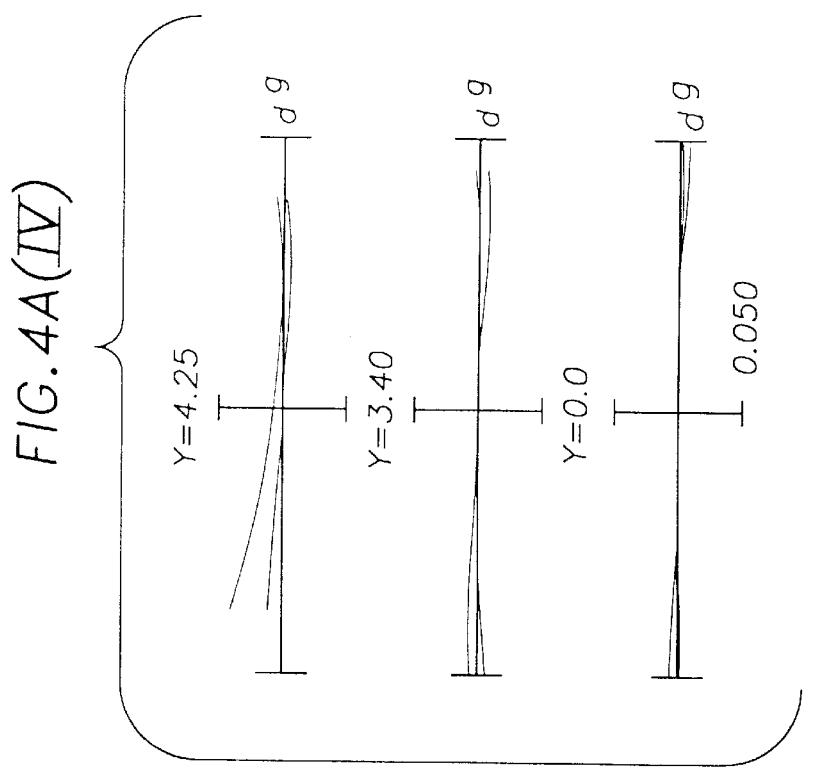
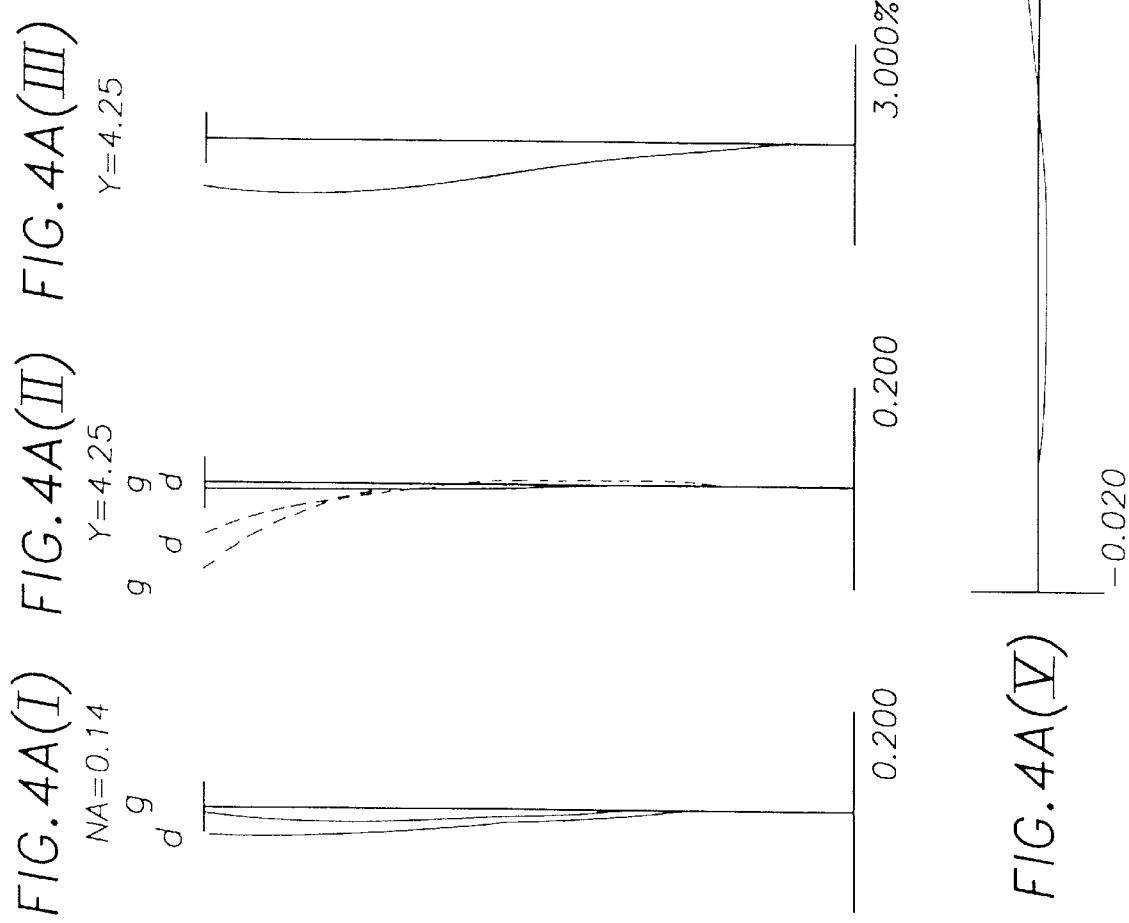

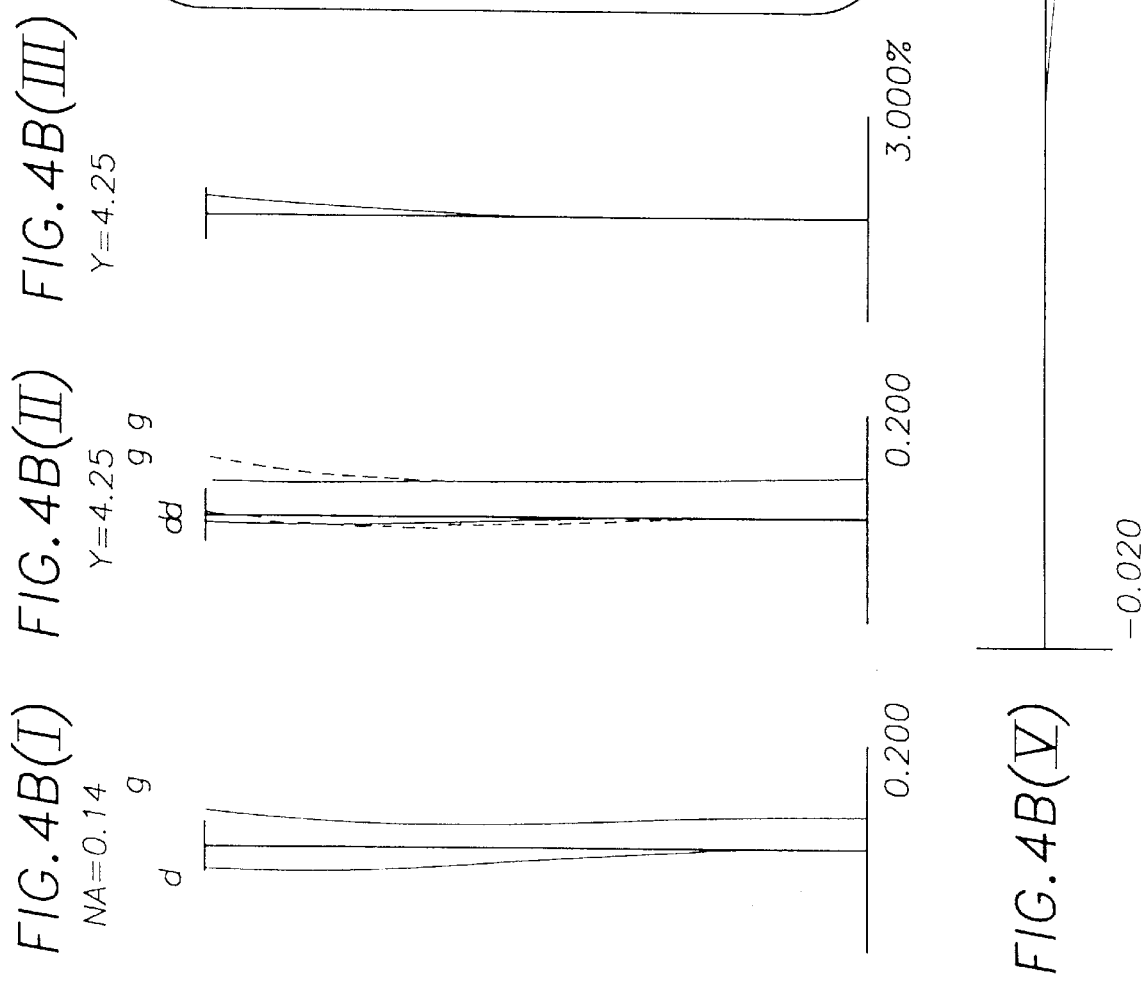

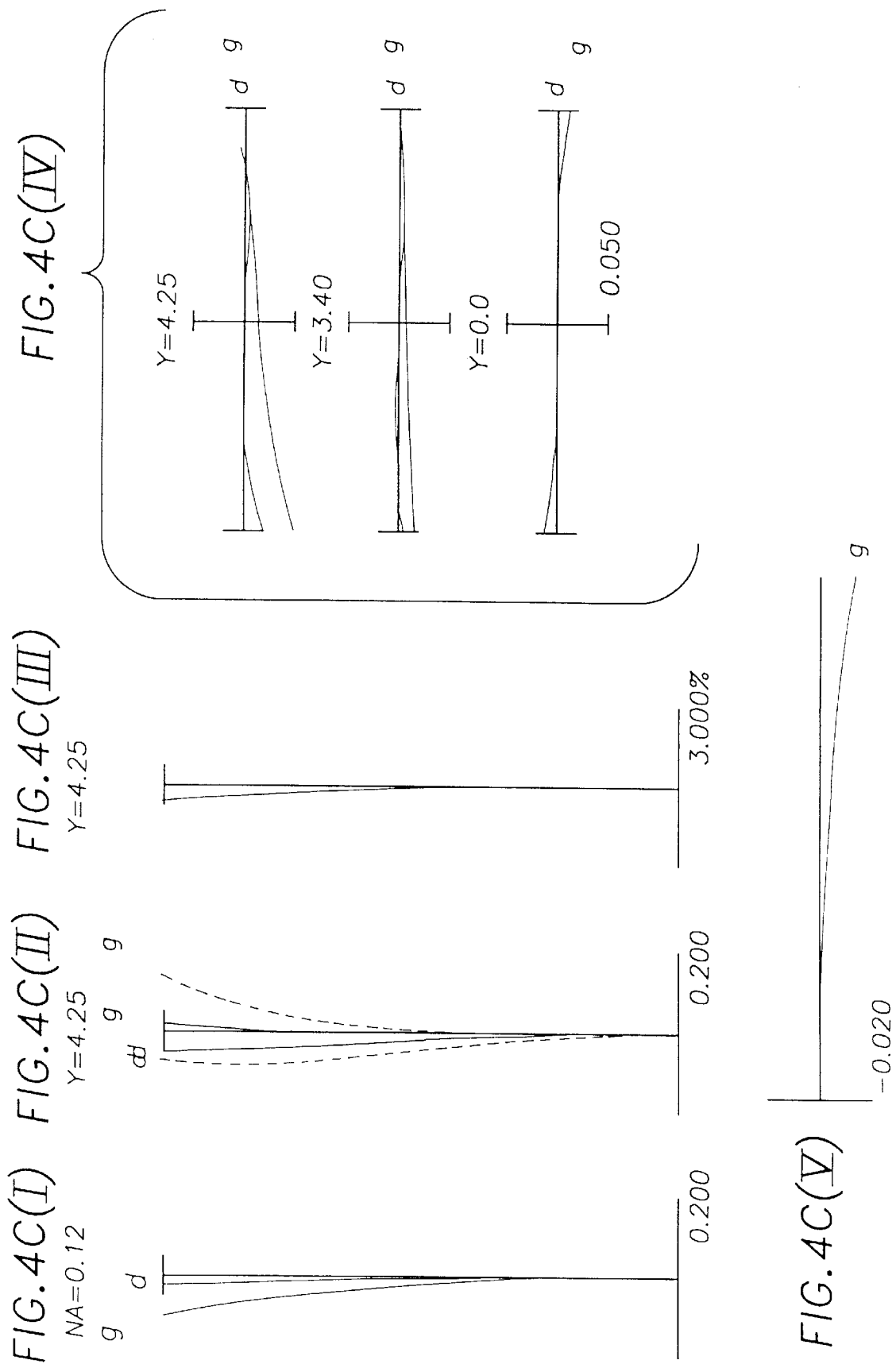

ZOOM LENS WITH LONG BACK FOCUS

FIELD OF THE INVENTION

The present invention relates to zoom lenses, and in particular to zoom lenses having a long back focus so as to be suitable for use with electronic image equipment employing CCD imaging devices and the like.

BACKGROUND OF THE INVENTION

The demand for increased performance of zoom lenses in recent years has resulted a variety of types of zoom lenses. In particular, zoom lenses for electronic image equipment, such as video cameras and digital still cameras, have employed to date so-called Yamaji-type zoom lenses and four-group type zoom lenses having an objectwise to imagewise positive-negative-positive-positive refractive power arrangement. However, these types of zoom lenses are disadvantageous because satisfactory imaging performance at an intermediate focal length state, as well as satisfactory correction of distortion, is not ensured.

With the progress in lens mechanical technology in recent years, zoom lens types having five or more lens groups have been proposed. However, it has proven extremely difficult to simultaneously achieve superior imaging performance, an increased field of view, an increased variable power (i.e., an increased zoom ratio), a compact size, and the like.

SUMMARY OF THE INVENTION

The present invention is a high-performance zoom lens having a long back focus and that has superior imaging performance even in the intermediate focal length state. The zoom lens also has satisfactory imaging performance at infinite focus or short-distance focus.

A first aspect of the invention is a zoom lens having a long back focus and capable of forming an image of an object and zooming between a maximum wide-angle state and a maximum telephoto state. The zoom lens comprises five lens groups. The first lens group has positive refractive power, the second lens group has negative refractive power and is separated from the first lens group by a first air space, the third lens group has negative refractive power and is separated from the second lens group by a second air space, the fourth lens group has positive refractive power, and the fifth lens group has positive refractive power and is separated from the fourth lens group by a third air space. The zoom lens is designed such that when zooming from the maximum wide-angle state to the maximum telephoto state, the first air space increases, the second air space changes in a manner that is at least one of linear and non-linear, and said third air space changes in a manner that is at least one of linear or non-linear. Further, the following conditions are satisfied:

$$2.0 < Bf_w/Y0 < 8.0$$

$$0.03 < (D23_t - D23_w)/f_w < 0.6$$

wherein $f_w$ is the focal length of the zoom lens in the maximum wide-angle state, $Bf_w$ is the back focus in the maximum wide-angle state, $Y0$ is the maximum image height, $D23_w$ is the axial extent of the second air space in the maximum wide-angle state, and $D23_t$ is the axial extent of the second air space in the maximum telephoto state.

A second aspect of the invention is the zoom lens described above, which further satisfies the conditions:

$$0.1 < f_2/f_3 < 2.0$$

$$2.0 < |f_3|/f_w < 10.0$$

wherein $f_2$ is the focal length of the second lens group and $f_3$ is the focal length of the third lens group.

A third aspect of the invention is the zoom lens as described above, wherein the first and fourth lens groups are fixed during zooming.

A fourth aspect of the invention is the zoom lens as described above, wherein the fifth lens group includes a cemented lens having a divergent convex surface having negative power and facing imagewise.

A fifth aspect of the invention is a zoom lens as described above, further satisfying the following condition:

$$0.3 < D23_m/f_w < 3.0$$

wherein $D23_m$ is the axial extent of the second air space in an intermediate focal length state.

A sixth aspect of the invention is a zoom lens as described above, further satisfying the following conditions:

$$0.7 < |f23_w|/f_w < 2.0$$

$$0.3 < D23_t/f_w < 1.8$$

wherein $f23_w$ is the composite focal length of the second lens group and the third lens group in the maximum wide-angle state, and $D23_t$ is the axial extent of the second air space in the maximum telephoto state.

A seventh aspect of the invention is a zoom lens as described above, wherein the fourth lens group includes a positive lens arranged most objectwise and a negative lens arranged most imagewise, with a first d-line refractive index differential therebetween. Also, the cemented lens of the fifth lens group comprises an objectwise lens and imagewise lens with a second d-line refractive index differential therebetween. Further, the mean value $\Delta N$ of the first and second d-line refractive index differentials satisfies the condition $\Delta N > 0.18$.

BRIEF DESCRIPTION OF THE DRAWINGS

FIGS. 2A(I)–2A(V) are aberration plots for spherical, astigmatism, distortion, coma and transverse chromatic aberration, respectively, for Working Example 1 in the maximum wide-angle state, infinite focus;

FIGS. 2B(I)–2B(V) are aberration plots for spherical, astigmatism, distortion, coma and transverse chromatic aberration, respectively, for Working Example 1 in the intermediate focal length state, infinite focus;

FIGS. 2C(I)–2C(V) are aberration plots for spherical, astigmatism, distortion, coma and transverse chromatic aberration, respectively, for Working Example 1 in the maximum telephoto state, infinite focus;

FIG. 3 is an optical diagram of the lens configuration of the zoom lens according to Working Example 2 of the present invention, with arrows depicting the axial movement (i.e., trajectory) of each lens group when zooming from the maximum wide-angle state (W), through the intermediate focal length state (M), to the maximum telephoto state (T);

FIGS. 4A(I)–4A(V) are aberration plots for spherical, astigmatism, distortion, coma and transverse chromatic aberration, respectively, for Working Example 2 in the maximum wide-angle state, finite focus;

FIGS. 4B(I)–4B(V) are aberration plots for spherical, astigmatism, distortion, coma and transverse chromatic aberration, respectively, for Working Example 2 in the intermediate focal length state, finite focus; and FIGS. 4C(I)–4C(V) are aberration plots for spherical, astigmatism, distortion, coma and transverse chromatic aberration, respectively, for Working Example 2 in the maximum telephoto state, finite focus.

DETAILED DESCRIPTION OF THE INVENTION

Figure 1:
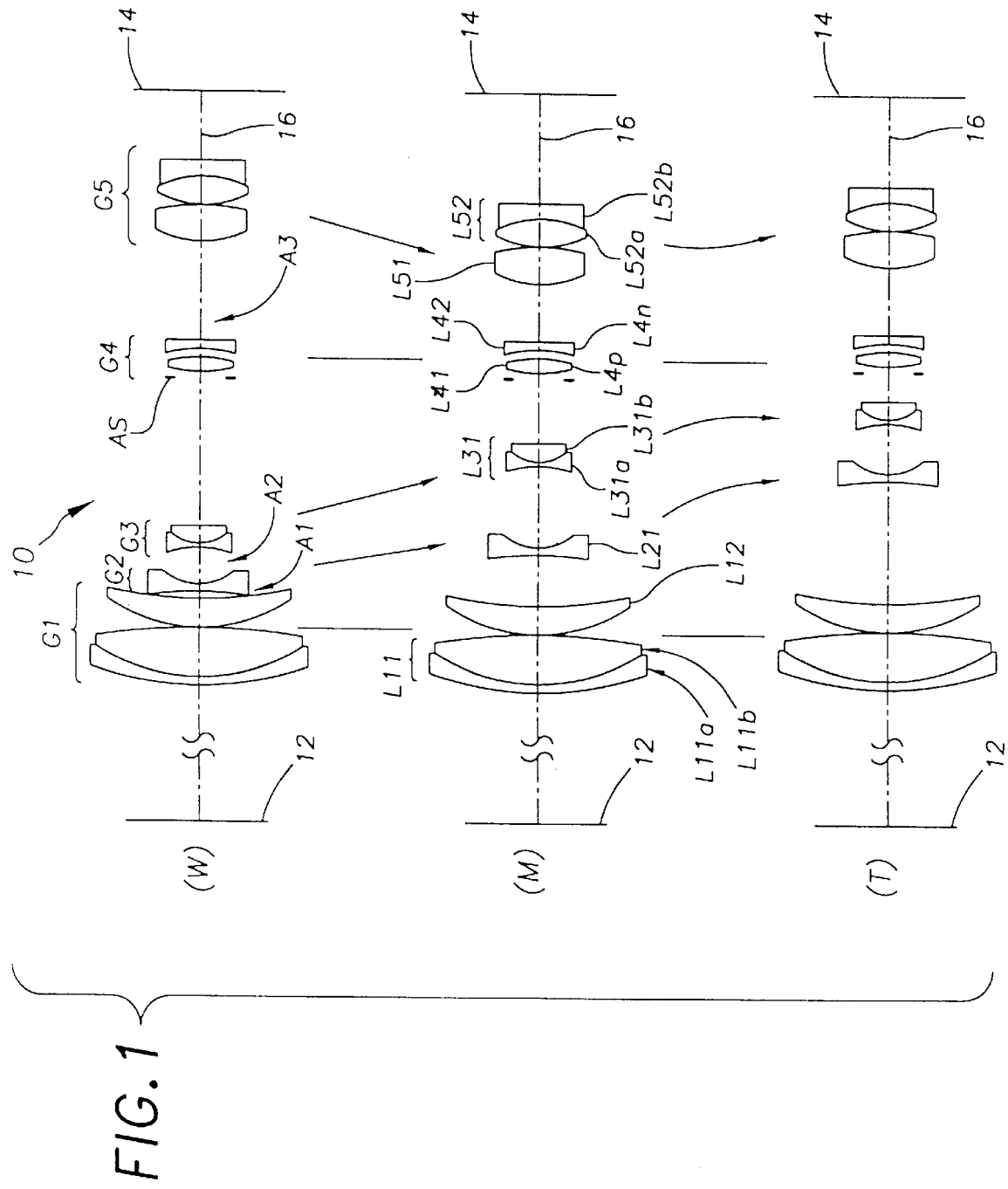
FIG. 1 is an optical diagram of the lens configuration of the zoom lens according to Working Example 1 of the present invention, with arrows depicting the axial movement (i.e., trajectory) of each lens group when zooming from the maximum wide-angle state (W), through the intermediate focal length state (M), to the maximum telephoto state (T)

The present invention relates to a zoom lenses, and in particular to zoom lenses having a long back focus so as to be suitable for electronic image equipment employing CCD imaging devices and the like. The zoom lens of the present invention provides high-performance imaging even in the intermediate focal length state, and has satisfactory imaging performance when used in at either infinite focus or short-distance focus (i.e., when focusing on a nearby object).

The zoom lens of the present invention is a multi-group zoom lens, whose general characteristics will first be explained. Since at least two lens groups are necessary to configure a zoom lens, a multi-group configuration, as the term is used herein, signifies a zoom lens configuration having three or more lens groups.

The number of lens groups that contribute to the variation in power of the zoom lens increases with a multi-group zoom lens. Thus, it is possible to increase the magnification of a zoom lens by employing multiple lens groups. In addition, since it is easier to equalize the aberration correction burden of each lens group, it is possible to achieve superior imaging performance. Multi-group zoom lenses also require a zoom lens mechanical construction having increased complexity due to the increase in the number of movable lens groups. However, problems associated with this complexity continue to be overcome with the progress in zoom lens mechanical technology.

In light of the above, the present invention adopts a five-group configuration having, objectwise to imagewise, positive-negative-negative-positive-positive refractive power arrangement comprising lens groups G1–G5 with air spaces A1, A2 and A3 between lens groups G1 and G2, between lens groups G2 and G3, and between lens groups G4 and G5, respectively (see, e.g., zoom lens 10 of FIG. 1). The lenses comprising each lens group G1–G5 and the change in air spaces A1–A3 during zooming are discussed in further detail below.

The present invention has many degrees of freedom for aberration correction, including degrees of freedom of movement of each lens group G1–G5, due to the increased number of lens groups. As a result, a zoom lens having a high magnification can be realized. Moreover, superior imaging performance can be obtained in the intermediate focal length state, in addition to the maximum wide-angle state and maximum telephoto state. Further, a zoom lens having a long back focus can be obtained which has satisfactory imaging performance at infinite focus or short-distance focus. Such a zoom lens is ideally suited for use with electronic image equipment, for example.

For the zoom lens of the present to achieve the above-described characteristics, it is preferred that at least one of a number of design conditions, set forth below, be satisfied.

The first two design conditions are expressed as:

$$2.0 < Bf_w/Y0 < 8.0 \quad (1)$$

$$0.03 < (D23_t - D23_w)/f_w < 0.6 \quad (2)$$

wherein, $Bf_w$ is the back focus in the maximum wide-angle state, $Y0$ is the maximum image height, $f_w$ is the focal length of the zoom lens in the maximum wide-angle state, $D23_w$ is the axial distance (i.e., the axial extent of air space A2) between second lens group G2 and third lens group G3 in the maximum wide-angle state, and $D23_t$ is the axial distance (i.e., the axial extent of air space A2) between second lens group G2 and third lens group G3 in the maximum telephoto state.

Condition (1) stipulates the condition for obtaining a sufficiently long back focus so that the zoom lens of the present invention is practical for use with electronic imaging equipment. Also, to avoid shading in an optical system for electronic imaging equipment, the exit pupil must be sufficiently distant from the image plane. For this purpose as well, it is important to satisfy condition (1).

If $Bf_w/Y0$ exceeds the upper limit value in condition (1), the back focus becomes too long, and the overall length of the zoom lens increases. This, in turn, invites an increase in the size of the zoom lens. In addition the lens diameter of fifth lens group G5 becomes excessively large.

Conversely, if $Bf_w/Y0$ falls below the lower limit value in condition (1), the back focus becomes too short, and it becomes difficult to maintain sufficient space to accommodate filters and prisms in the optical path between the most imagewise lens in the zoom lens and the image pickup device, such as a CCD. In addition, the abovementioned shading is produced easily, since the position of the exit pupil approaches too close to the image plane.

Furthermore, to more sufficiently meet the goals of the present invention, it is preferable in condition (1) to set the upper limit value to 5.0 and the lower limit value to 3.0.

Condition (2) stipulates an appropriate range for the ratio of the axial air space differential $(D23_t - D23_w)$ for air space A2 between second lens group G2 and third lens group G3 in the maximum wide-angle state and maximum telephoto state, respectively, to the focal length $f_w$ of the zoom lens in the maximum wide-angle state.

If $(D23_t - D23_w)/f_w$ exceeds the upper limit value in condition (2), the overall zoom lens length in the maximum wide-angle state increase excessively, inviting an increase in the front lens group diameter (i.e., the lens diameter of first lens group G1). Also, the field curvature in both the maximum wide-angle state and maximum telephoto state shifts greatly toward the negative side. Also, spherical aberration in the maximum telephoto state cannot be sufficiently corrected. In addition, when zooming, it becomes difficult to ensure sufficient axial movement space for second lens group G2 when zooming, and to ensure a large change in the working magnification of third lens group G3. Further, it becomes difficult to increase magnification.

If $(D23_t - D23_w)/f_w$ falls below the lower limit value in condition (2), it becomes difficult to increase the zoom ratio and to equalize the aberration correction burden of each lens group when zooming. Also, the generation and fluctuation of various aberrations when zooming increases excessively. In particular, the fluctuation in field curvature and coma when zooming increases, and the field curvature in the maximum telephoto state increases excessively toward the negative side. In addition, excessively large positive coma is generated with respect to the rays below the principle ray in the maximum wide-angle state. Similarly, excessively large positive coma is generated with respect to the rays above the principle ray in the maximum telephoto state. As a result, satisfactory imaging performance can no longer be obtained.

Furthermore, to more sufficiently meet the goals of the present invention, it is preferable in condition (2) to set the upper limit value to 1.0 and the lower limit value to 0.2.

The relative positional relationship of second lens group G2 and third lens group G3 with respect to first lens group G1 in the intermediate focal length state is also important. In the zoom lens of the present invention, it was found that the fluctuation of aberration when zooming could be controlled and satisfactory imaging performance could be achieved by appropriately setting the abovementioned relative positional relationship, as explained immediately below.

The movement locus (i.e., trajectory) of third lens group G3 when zooming will first be explained with regard to the fluctuation of aberration when zooming. If the movement locus of third lens group G3 when zooming is made objectwise convex nonlinear, spherical aberration can be shifted toward the negative (−) side if the rays from the axial object point passing through second lens group G2 in the intermediate focal length state diverge. Also, spherical aberration can be shifted toward the positive (+) side if the rays from the axial object point converge. In addition, the field curvature can be corrected toward the positive (+) side.

Conversely, if the movement locus of third lens group G3 when zooming is made objectwise concave nonlinear, spherical aberration can be shifted toward the positive (+) side if the rays from the axial object point passing through second lens group G2 in the intermediate focal length state diverge. Also, spherical aberration can be shifted toward the negative (−) side if the rays from the axial object point converge. In addition, the field curvature can be corrected toward the negative (−) side.

By exploiting the abovementioned properties, the fluctuation of aberration that cannot be completely corrected by lens groups other than second lens group G2 and third lens group G3 can also be corrected. This point can be clearly seen in the Working Examples set forth below. In cases where there are sufficient degrees of freedom of aberration correction from lens groups other than second lens group G2 and third lens group G3, sufficient imaging performance can be obtained even if the movement loci of second lens group G2 and third lens group G3 are linear. Such cases are also included in the scope of the present invention. In this manner, it was found in the present invention that superior imaging performance can be achieved in the intermediate focal length state by changing the axial extent of air space A2 (see FIG. 1) between second lens group G2 and third lens group G3 in a manner that is either linear or non-linear (see FIG. 1).

In addition, when configuring an actual zoom lens, it is preferable to fix first lens group G1 and fourth lens group G4 when zooming. This configuration is mechanically simple, and reduces the effect of manufacturing errors. In particular, the steadiness and dustproofness of the lens mechanical construction increases if first lens group G1 is fixed.

In addition to the configuration mentioned above, in another preferred embodiment of the zoom lens of the present invention, it is preferable to satisfy the following design conditions (3) and (4):

$$0.1 < f_2/f_3 < 2.0 \tag{3}$$

$$2.0 < |f_3|/f_w < 10.0 \tag{4}$$

wherein $f_2$ is the focal length of second lens group G2, $f_3$ is the focal length of third lens group G3. Condition (3) stipulates an appropriate range for the ratio of focal length $f_2$ of second lens group G2 to focal length $f_3$ of third lens group G3.

If $f_2/f_3$ exceeds the upper limit value in condition (3), it is undesirable since focal length $f_3$ of third lens group G3 decreases excessively, the fluctuation of coma when zooming increases, and distortion in the maximum telephoto state shifts greatly toward the positive side. In addition, positive lower coma is generated in the maximum wide-angle state, spherical aberration in the maximum telephoto state is excessively corrected on the positive side, and satisfactory imaging performance can no longer be obtained.

Conversely, if $f_2/f_3$ falls below the lower limit value in condition (3), it is undesirable, since focal length $f_2$ of second lens group G2 decreases excessively, the fluctuation of coma when zooming increases, and distortion in the maximum telephoto state shifts greatly toward the negative side. In addition, negative lower coma is generated in the maximum wide-angle state, spherical aberration in the maximum telephoto state is excessively corrected on the negative side, and satisfactory imaging performance can no longer be obtained.

To more sufficiently meet the goals of the present invention, it is preferable in condition (3) to set the upper limit value to 0.5 and the lower limit value to 0.15.

Condition (4) stipulates an appropriate range for the ratio between focal length $f_3$ of third lens group G3 and focal length $f_w$ of the zoom lens in the maximum wide-angle state. If $|f_3|/f_w$ exceeds the upper limit value in condition (4), it is undesirable since, if focal length $f_3$ of third lens group G3 increases excessively and third lens groups G3 and those beyond are identical, then the overall length of the zoom lens in the maximum wide-angle state increases, lower coma in the maximum wide-angle state increases excessively toward the positive side, and the Petzval sum tends toward the negative side.

Conversely, if $|f_3|/f_w$ falls below the lower limit value in condition (4), it is undesirable, since, if focal length $f_3$ of third lens group G3 decreases excessively and third lens group G3 and those beyond are identical, then it becomes difficult to ensure an adequately long back focus in the maximum wide-angle state, and the fluctuation of field curvature when zooming increases.

To more sufficiently meet the goals of the present invention, it is preferable in condition (4) to set the upper limit value to 7.0 and the lower limit value to 4.0.

In another preferred embodiment of the present invention, it is preferable to satisfy the following design condition (5):

$$0.3 < D23_m/f_w < 3.0 \tag{5}$$

wherein $D23_m$ is the axial extent of air space A2 between second lens group G2 and third lens group G3 in the intermediate focal length state. Furthermore, the intermediate focal length state when stipulating $D23_m$, has twice the focal length of focal length $f_w$ (i.e., $2 \times f_w$) of the zoom lens in the maximum wide-angle state if the zoom lens is set at infinite focus. In addition, the intermediate focal length state has twice the magnification $\beta_w$ (i.e., $2 \times \beta_w$) of the zoom lens in the maximum wide-angle state if the zoom lens is set at short-distance focus.

Condition (5) is for ensuring a sufficient amount of light in the periphery of the image field (i.e., a peripheral quantity of light) in the vicinity of the maximum wide-angle state, and for satisfactorily correcting aberration. Condition (5) is significant in that it makes it possible to maintain a peripheral quantity of light and to maintain aberration correction by appropriately setting the relative positional relationship between second lens group G2 and third lens group G3 with respect to first lens group G1, Generally, in zoom lenses having, objectwise to imagewise, at least a positive lens group and a negative lens group which move to vary power, as in the present invention, the amount of light reaching the periphery of the image field is deficient. As it turns out, the peripheral quantity of light generally decreases markedly due to the tendency of the principle ray to pass through the periphery of first lens group G1 when in a focal length state wherein power is varied slightly from the maximum wide-angle state toward the maximum telephoto state.

To overcome this shortcoming, the present invention sets the axial extent of the air space A2 between second lens group G2 and third lens group G3 in the intermediate focal length state (see FIG. 1) to an appropriate range. This avoids an excessive principle ray height at first lens group G1, without an excessive axial separation between second lens group G2 and first lens group G1. Furthermore, setting the axial extent of air space A2 between second lens group G2 and third lens group G3 in the intermediate focal length state to an appropriate range has the effect of reducing positive high-order distortion.

Thus, if $D23_m/f_w$ exceeds the upper limit in condition (5), it is undesirable, since the fluctuation of coma in the intermediate focal length state and the fluctuation of astigmatism increase. In addition, the overall length of the zoom lens in the intermediate focal length state increases, and the mechanical configuration becomes complex.

Conversely, if $D23_m/f_w$ falls below the lower limit in condition (5), it is undesirable, since the image plane tends to be displaced toward the negative side, and the fluctuation of coma of the rays below the principle ray increases. In addition, due to the tendency of the principle ray to pass through the periphery of first lens group G1, the quantity of light passing through the zoom lens decreases markedly. Also, high-order positive distortion is generated.

In addition, in the zoom lens of the present invention, it was found that, if the field angle in the maximum wide-angle state is greater that 50°, solving the trajectory while satisfying condition (5) is particularly effective in ensuring a peripheral quantity of light while in the intermediate focal length state.

Furthermore, to more sufficiently meet the goals of the present invention, it is preferable in condition (5) to set the upper limit value to 2.0 and the lower limit value to 0.65.

In another preferred embodiment of the present invention, it is preferable to satisfy the following design conditions (6) and (7):

$$0.7 < |f23_w|/f_w < 2.0 \tag{6}$$

$$0.3 < D23_t/f_w < 1.8 \tag{7}$$

wherein $f23_w$ is the composite focal length of second lens group G2 and third lens group G3 in the maximum wide-angle state. Condition (6) stipulates an appropriate range for the ratio of composite focal length $f23_w$ of second lens group G2 and third lens group G3 in the maximum wide-angle state, to focal length $f_w$ of the zoom lens in the maximum wide-angle state.

If $|f23|/f_w$ exceeds the upper limit value in condition (6), it is undesirable since, if the fluctuation of coma and the fluctuation of astigmatism increase when zooming and if fourth lens group G4 and those beyond are identical, it becomes difficult to ensure an adequately long back focus in the maximum wide-angle state.

Conversely, if $|f23_w|/f_w$ falls below the lower limit in condition (6), it is undesirable since, if fourth lens group G4 and those beyond are identical, then not only does the overall length of the zoom lens in the maximum wide-angle state increase, but the lens diameters of fourth lens group G4 and those beyond increase, which prevents increased compactness.

To more sufficiently meet the goals of the present invention, it is preferable in condition (6) to set the upper limit value to 1.5 and the lower limit value to 0.8.

Condition (7) stipulates an appropriate range for the ratio of the axial extent $D23_t$ of air space A2 between second lens group G2 and third lens group G3 in the maximum telephoto state to focal length $f_w$ of the zoom lens in the maximum wide-angle state.

If $D23_t/f_w$ exceeds the upper limit in condition (7), it is undesirable since spherical aberration in the maximum telephoto state tends to increase excessively. In addition, if first lens group G1 and fourth lens group G4 are fixed when zooming, it becomes difficult to ensure an increased zoom ratio.

Conversely, if $D23_t/f_w$ falls below the lower limit in condition (7), it is undesirable since the field curvature shifts toward the negative side. In addition, coma of the rays below the principle ray increases.

To more sufficiently meet the goals of the present invention, it is preferable in condition (7) to set the upper limit value to 1.2 and the lower limit value to 0.8.

In another preferred embodiment of the present invention, it is preferable that fourth lens group G4 include a positive lens L4p arranged most objectwise and negative lens L4n arranged most imagewise. Further, it is preferable that fifth lens group G5 include a cemented lens having a divergent convex surface having negative power and facing imagewise (see FIGS. 1 and 3). Also, it is preferred that the following design condition (8) is satisfied:

$$\Delta N > 0.18 \tag{8}$$

wherein $\Delta N$ is the mean value of the d-line refractive index differential between positive lens L4p and negative lens L4n of fourth lens group G4, and the d-line refractive index differential between the objectwise lens and imagewise lens that interpose the joined surface in fifth lens group G5.

For a zoom lens having a long back focus compared with the maximum image height, axial rays passing through the most imagewise lens group tend to travel therethrough far from the optical axis (i.e., the ray height is large), making correction of aberration of these axial rays difficult. In the zoom lens of the present invention, as described in condition (8), it was found that aberrations associated with the above-mentioned axial rays could be satisfactorily corrected by setting the value of $\Delta N$ to an appropriate range. It is also preferable that, in fourth lens group G4, the refractive index of positive lens L4p be lower than the refractive index of negative lens L4n.

If $\Delta N$ falls below the lower limit in condition (8), correction of spherical aberration becomes difficult, and satisfactory imaging performance can no longer be obtained. Furthermore, the Petzval sum tends to shift toward the negative side.

When configuring the actual zoom lens, it is preferable to further satisfy certain structural requirements discussed below. Short-distance focusing may be performed by a so-called front focusing system, wherein first lens group G1 is moved axially objectwise. However, it is important to ensure a sufficient peripheral quantity of light without the principle ray dropping down when focusing. Thus, a so-called rear focusing system is preferable, where focusing is performed by axially moving fifth lens group G5.

With reference to zoom lenses 10 and 20 in FIGS. 1 and 3, respectively, to satisfactorily correct chromatic aberration, it is preferable that first lens group G1 include at least one cemented lens L11 having positive refractive power. In addition, it is preferable that a negative lens L11a, whose convex surface faces objectwise, be arranged most objectwise in first lens group G1.

From the viewpoint of correcting aberration, in a preferred embodiment, second lens group G2 comprises a negative meniscus lens L21 whose convex surface faces objectwise. Furthermore, to achieve an even higher degree of imaging performance, in a preferred embodiment second lens group G2 comprises a negative lens L2 having at least one aspherical surface. Furthermore, when zooming from the maximum wide-angle state to the maximum telephoto state, it is preferable that the working magnification of second lens group G2 change and pass through unity magnification (−1 magnification).

To satisfactorily correct chromatic aberration, it is preferable that at least one of second lens group G2 and third lens group G3 have a cemented lens having negative refractive power. Further, it is preferable that the difference in the Abbe numbers of the lenses comprising the cemented lens be 10 or greater.

Furthermore, it is preferable that the working magnification β3 of third lens group G3 be a positive value over the entire zooming range (i.e., from the extreme wide-angle state to the extreme telephoto state).

As discussed above, it is preferable that fourth lens group G4 be fixed when zooming, since this simplifies the mechanical configuration. Since fourth lens group G4 is effective in the correction of spherical aberration, it is preferable in lens group G4 that a biconvex lens L41 be arranged most objectwise and a negative lens L42 be arranged most imagewise (see zoom lens 10, FIG. 1). It may also be preferred that biconvex lens L41 and negative lens L42 be combined as lenses L41a nd L41b in a cemented lens L41 (see zoom lens 20, FIG. 3), since chromatic aberration is satisfactorily corrected and the effect of manufacturing errors can be reduced. Also, by introducing an aspherical surface in the positive lens arranged most objectwise in fourth lens group G4, image brightness can be increased. In addition, it is preferred that an aperture stop be AS arranged in the vicinity of fourth lens group G4. This configuration is advantageous for aberration correction, and simplifies the mechanical construction by fixing aperture stop AS when zooming, the same as fourth lens group G4.

Furthermore, by displacing certain lenses in fourth lens group G4 or by displacing certain lens groups, in a direction nearly perpendicular to optical axis 16 (see zoom lens 10, FIG. 1), the so-called antivibration function can be achieved. It is preferable that the antivibration lens group have at least one positive lens and at least one negative lens.

Also, to satisfactorily correct chromatic aberration, it is preferable that fifth lens group G5 have at least one cemented lens L52 (see zoom lens 10, FIG. 1) having positive refractive power. Furthermore, it is preferable that cemented lens L52 have a divergent convex surface having negative power and facing imagewise. Furthermore, it is preferable that biconvex lens L51 be arranged most objectwise in fifth lens group G5.

In addition, it will be appreciated by one skilled in the art of lens design that use of aspherical lenses, gradient-index lenses, and diffractive optical elements and the like, is effective in further increasing imaging performance of the zoom lens of the present invention.

Working Examples

Zoom lenses 10 and 20 of FIGS. 1 and 3, respectively, represent Working Examples 1 and 2, respectively, of the present invention. Zoom lenses 10 and 20 comprise, from object plane 12 to image plane 14 along optical axis 16 (i.e., objectwise to imagewise), first lens group G1 having positive refractive power, second lens group G2 having negative refractive power, third lens group G3 having negative refractive power, fourth lens group G4 having positive refractive power, and fifth lens group G5 having positive refractive power. Furthermore, when zooming from the maximum wide-angle state to the maximum telephoto state, second lens group G2, third lens group G3 and fifth lens group G5 move axially so that air space A1 between first lens group G1 and second lens group G2 increases, air space A2 between second lens group G2 and third lens group G3 changes non-linearly, and the air space A3 between fourth lens group G4 and fifth lens group G5 changes non-linearly. First lens group G1 and fourth lens group G4 are fixed when zooming.

Working Examples 1 and 2 and are set forth below in Tables 1a–d and Table 2a–c, respectively. In the Tables, f is the focal length of the entire zoom lens, FNO is the f-number, Bf is the back focus, and φ is the radius of aperture stop AS. In addition, $f_m$ indicates the focal length of the zoom lens in the intermediate focal length state. S indicates the lens surface number objectwise to imagewise (i.e., along the direction in which the light rays travel), and n(d) and n(g) indicate the refractive index with respect to the d-line (λ=587.6 nm) and g-line (λ=435.8 nm), respectively.

Also, in each aberration plot, Y is the image height, d is the d-line (λ=587.6 nm) and g is the g-line (λ=435.8 nm). In addition, in the aberration plots for astigmatism (FIGS. 2A(II)–2C(II) and FIGS. 4A(II)–4C(Il)), the solid line shows the sagittal image plane, and the broken line shows the meridional image plane.

Working Example 1

Zoom lens 10 of FIG. 1 is Working Example 1 of the present invention and is suitable for use with electronic imaging equipment requiring a zoom lens set at infinite focus. First lens group G1 comprises, from object plane 12 to image plane 14 along optical axis 16 (i.e., objectwise to imagewise), a cemented positive lens L11 comprising a negative meniscus lens L11a whose convex surface faces objectwise and a biconvex lens L11b, and a positive meniscus lens L12 whose convex surface faces objectwise. Second lens group G2 comprises a biconcave lens L21 having an objectwise aspherical surface. Third lens group G3 comprises, objectwise to imagewise, a cemented negative lens L31 comprising a biconcave lens L31a and a positive meniscus lens L31b whose convex surface faces objectwise. Fourth lens group G4 comprises, objectwise to imagewise, a biconvex lens L41 and a negative meniscus lens L42 whose concave surface faces objectwise. Fifth lens group G5 comprises, objectwise to imagewise, a biconvex lens L51 having an imagewise aspherical surface, and a cemented positive lens L52 comprising a biconvex lens L52a and a negative meniscus lens L52b whose concave surface faces objectwise.

When zooming, second lens group G2, third lens group G3, and fifth lens group G5 move along the trajectories shown by the arrows in FIG. 1. First lens group G1 and fourth lens group G4 are fixed. In addition, aperture stop AS is arranged in the vicinity of fourth lens group G4 between third lens group G3 and fourth lens group G4. Aperture stop AS is fixed when zooming, the same as fourth lens group G4.

In Working Example 1, an aspherical surface is expressed as:

$$S(y)=(y^2/R)/\{1+(1-\kappa \cdot y^2/R^2)^{1/2}\}+C_4 \cdot y^4+C_6 \cdot y^6+C_8 \cdot y^8+C_{10} \cdot y^{10}+ \quad (a)$$

wherein y is the height in the direction perpendicular to optical axis 16, S(y) is the amount of deflection (amount of sag) of height y in the direction of optical axis 16, R is the standard radius of curvature (vertex radius of curvature), $\kappa$ is the conical coefficient, and $C_n$ is the nth-order aspherical surface coefficient. The aspherical surface data is provided in Table 1b.

The following Tables 1a–d list the specification values of Working Example 1 of the present invention.

TABLE 1a

DESIGN TABLE

| | f | 7.85 | 15.7 | 62.8 |
|---|---|---|---|---|
| | FNO | 2.82 | 2.89 | 2.82 |
| | φ | 8.60 | | |

| S | r | d | ν | n(d) | n(g) |
|---|---|---|---|---|---|
| 1 | 72.4877 | 1.5000 | 23.01 | 1.860741 | 1.910649 |
| 2 | 37.9615 | 8.0000 | 65.42 | 1.603001 | 1.614372 |
| 3 | −235.8323 | 0.5000 | | | |
| 4 | 30.5625 | 5.7452 | 55.60 | 1.696800 | 1.712319 |
| 5 | 88.5963 | (d5 = variable) | | | |
| 6 | −87.2833 | 1.2000 | 61.09 | 1.589130 | 1.601033 |
| 7 | 8.9513 | (d7 = variable) | | | |
| 8 | −24.2898 | 1.5000 | 37.90 | 1.723421 | 1.748045 |
| 9 | 10.0575 | 3.4086 | 23.01 | 1.860741 | 1.910649 |
| 10 | 70.4631 | (d10 = variable) | | | |
| 11 | ∞ | 1.0000 | (Aperture Stop) | | |
| 12 | 18.3247 | 3.1652 | 64.10 | 1.516800 | 1.526703 |
| 13 | −21.1803 | 2.0000 | | | |
| 14 | −14.7684 | 2.0000 | 37.90 | 1.723421 | 1.748045 |
| 15 | −34.2152 | (d15 = variable) | | | |
| 16 | 21.2261 | 5.9965 | 64.10 | 1.516800 | 1.526703 |
| 17 | −59.9723 | 0.1042 | | | |
| 18 | 25.1830 | 4.9944 | 64.10 | 1.516800 | 1.526703 |
| 19 | −18.9683 | 2.5000 | 23.01 | 1.860741 | 1.910649 |
| 20 | −136.6006 | (Bf = variable) | | | |

TABLE 1b

ASPHERIC SURFACE DATA

| S6 | r = −87.2833 | κ = 1.0000 | $C_4 = +3.32490 \times 10^{-5}$ |
|---|---|---|---|
| /// | $C_6 = +2.75250 \times 10^{-8}$ | $C_8 = −1.23170 \times 10^{-9}$ | $C_{10} = +3.22980 \times 10^{-12}$ |
| S17 | r = −59.9723 | κ = 1.0000 | $C_4 = +2.97470 \times 10^{-5}$ |
| /// | $C_6 = −7.27790 \times 10^{-8}$ | $C_8 = −7.61270 \times 10^{-11}$ | $C_{10} = +5.31720 \times 10^{-12}$ |

TABLE 1c

VARIABLE SPACING WHEN VARYING POWER (ZOOMING)

| Lens Position | Wide-Angle | Intermediate | Telephoto |
|---|---|---|---|
| f | 7.85 | 15.70 | 62.80 |
| d5 | 1.00000 | 9.92095 | 22.90002 |
| d7 | 6.50000 | 14.00000 | 8.60227 |
| d10 | 27.00000 | 10.57905 | 2.99771 |
| d15 | 17.04789 | 11.56013 | 14.20316 |
| Bf | 13.41951 | 18.90563 | 16.26424 |

TABLE 1d

DESIGN CONDITION VALUES $Bf_w = 13.420$
$Y0 = 4.0$
$D23_t = 8.60227$
$D23_w = 6.50000$
$D23_m = 14.00000$
$f_w = 7.850$
$f_t = 62.800$
$f_m = 15.7$
$f_2 = −13.717$
$f_3 = −34.891$
$f23_w = −8.561$
$\Delta N = 0.27528$
(1) $Bf_w/Y0 = 3.3550$
(2) $(D23_t − D23_w)/f_w = 0.2678$
(3) $f_2/f_3 = 0.3931$
(4) $|f_3|/f_w = 4.4450$
(5) $D23_m/f_w = 1.78571$
(6) $|f_{23w}|/f_w = 1.0906$
(7) $D23_t/f_w = 1.0958$
(8) $\Delta N = 0.27528$ FIGS. 2A–2C are aberration plots for Working Example 1 with respect to the d-line (λ=587.6 nm) and g-line (λ=435.8 nm). As is clear from these aberration plots, the various aberrations in each focal length state from the maximum wide-angle state to the telephoto state are satisfactorily corrected.

Working Example 2

Zoom lens 20 of FIG. 3 is Working Example 2 of the present invention and is suitable for use with electronic imaging equipment requiring a zoom lens with a short-distance focus. First lens group G1 comprises, from object plane 12 to image plane 14 along optical axis 16 (i.e., objectwise to imagewise), a cemented positive lens L11 that joins a negative meniscus lens L11a whose convex surface faces objectwise and a biconvex lens, and a positive meniscus lens L11b whose convex surface faces objectwise. Second lens group G2 comprises a negative meniscus lens L2 whose convex surface faces objectwise. Third lens group G3 comprises, objectwise to imagewise, a cemented negative lens L31 comprising a biconcave lens L31a and a positive meniscus lens L31b whose convex surface faces objectwise. Fourth lens group G4 comprises, objectwise to imagewise, a cemented positive lens L41 comprising a biconvex lens L41a and a negative meniscus lens L41b whose concave surface faces objectwise. Fifth lens group G5 comprises, objectwise to imagewise, a biconvex lens L51 and a cemented positive lens L52 comprising a biconvex lens L52a and a negative meniscus lens L52b whose concave surface faces objectwise.

When zooming, second lens group G2, third lens group G3, and fifth lens group G5 move along the trajectories shown by the arrows in FIG. 3. First lens group G1 and fourth lens group G4 are fixed. In addition, aperture stop AS is arranged in the vicinity of fourth lens group G4 between third lens group G3 and fourth lens group G4. Aperture stop AS is fixed when zooming, the same as fourth lens group G4.

The following Tables 2a–c list the specification values of Working Example 2 of the present invention. In Tables 2a–b, β is the lateral magnification, NA is the numerical aperture, and D0 is the object point distance (i.e., the axial distance between the most objectwise lens surface and the object). In addition, in Table 2c, $β_w$, $β_m$ and $β_t$ are the lateral magnifications in the maximum wide-angle state, the intermediate focal length state and the maximum telephoto state, respectively.

TABLE 2a

DESIGN TABLE

| β | −0.0165 | −0.0330 | −0.0990 |
|---|---|---|---|
| NA | 0.14 | 0.14 | 0.12 |
| φ | 6.54 | | |

| S | r | d | ν | n(d) | n(g) |
|---|---|---|---|---|---|
| 1 | 67.0367 | 1.6000 | 21.60 | 1.784700 | 1.824660 |
| 2 | 31.1162 | 8.6000 | 60.35 | 1.620410 | 1.633120 |
| 3 | −355.6780 | 0.1000 | | | |
| 4 | 29.5164 | 5.0000 | 55.48 | 1.696800 | 1.712350 |
| 5 | 85.5580 | (d5 = variable) | | | |
| 6 | 135.5811 | 1.2000 | 37.35 | 1.834000 | 1.862680 |
| 7 | 9.5568 | (d7 = variable) | | | |
| 8 | −58.2538 | 1.5000 | 61.24 | 1.589130 | 1.601000 |
| 9 | 9.2694 | 3.5000 | 23.83 | 1.846660 | 1.893900 |
| 10 | 22.5681 | (d10 = variable) | | | |
| 11 | ∞ | 1.2000 | | Aperture Stop | |
| 12 | 23.8130 | 4.6000 | 64.20 | 1.516800 | 1.526670 |
| 13 | −8.6049 | 4.0000 | 60.74 | 1.603110 | 1.615400 |
| 14 | −57.9764 | (d14 = variable) | | | |
| 15 | 197.5827 | 4.0000 | 64.20 | 1.516800 | 1.526670 |
| 16 | −21.3351 | 0.1000 | | | |
| 17 | 26.7109 | 5.0000 | 81.61 | 1.497000 | 1.504510 |
| 18 | −15.0196 | 2.5000 | 25.46 | 1.805180 | 1.847010 |
| 19 | −48.0019 | (Bf = variable) | | | |

TABLE 2b

VARIABLE SPACING WHEN VARYING POWER (ZOOMING)

| Lens Position | Wide-Angle | Intermediate | Telephoto |
|---|---|---|---|
| β | −0.01652 | −0.03304 | −0.09900 |
| D0 | 455.0 | 455.0 | 455.0 |
| d5 | 1.14512 | 11.31376 | 21.08048 |
| d7 | 4.94778 | 5.37363 | 9.23430 |
| d10 | 26.70500 | 16.11051 | 2.48312 |
| d14 | 12.03693 | 8.82229 | 3.17471 |
| Bf | 19.41829 | 22.63293 | 28.28051 |

TABLE 2c

DESIGN CONDITION VALUES:

$Bf_w$ = 19.418
$Y0$ = 4.25
$D23_t$ = 9.23430
$D23_w$ = 4.94778
$D23_m$ = 5.37363
$f_w$ = 7.999
$f_t$ = 57.327
$β_w$ = −0.01652
$β_t$ = −0.099
$β_m$ = −0.03304
$f_2$ = −12.382
$f_3$ = −53.579
$f23_w$ = −8.838

TABLE 2c-continued

DESIGN CONDITION VALUES:

ΔN = 0.197245
(1) $Bf_w/Y0$ = 4.5689
(2) $(D23_t - D23_w)/f_w$ = 0.5309
(3) $f_2/f_3$ = 0.2311
(4) $|f_3|/f_w$ = 6.6982
(5) $D23_m/f_w$ = 0.67179
(6) $|f_{23w}|/f_w$ = 1.1049
(7) $D23_t/f_w$ = 1.1544
(8) ΔN = 0.19725

FIGS. 4A–4C are aberration plots for Working Example 2 with respect to the d-line (λ=587.6 nm) and g-line (λ=435.8 nm). As is clear from these aberration plots, the various aberrations in each focal length state from the wide-angle state to the telephoto state are satisfactorily corrected.

In each Working Example discussed above, first lens group G1 and fourth lens group G4 are fixed when zooming. However, it is also possible, without deviating from the present invention, to make the lens group configuration such that first lens group G1 and fourth lens group G4 move axially when zooming. In this case, the number of degrees of freedom of aberration correction increases, making it easier to design a zoom lens that meets the goals of the present invention.

As explained above, the present invention is a high-performance zoom lens having a long back focus, and superior imaging performance even in the intermediate focal length state.

Satisfactory imaging performance can be achieved at infinite focus or when focusing on a short-distance object. Accordingly, the zoom lens of the present invention is ideally suited for use with electronic imaging equipment, such as video cameras, digital still cameras, and the like.

While the present invention has been described in connection with preferred embodiments and Working Examples, it will be understood that it is not so limited. On the contrary, it is intended to cover all alternatives, modifications and equivalents as may be included within the spirit and scope of the invention as defined in the appended claims.

What is claimed is:

1. A zoom lens having a long back focus and capable of forming an image of an object and zooming between a maximum wide-angle state to a maximum telephoto state, comprising, objectwise to imagewise:

a) a first lens group having positive refractive power;
   b) a second lens group having negative refractive power and separated from said first lens group by a first air space;
   c) a third lens group having negative refractive power and separated from said second lens group by a second air space;
   d) a fourth lens group having positive refractive power;
   e) a fifth lens group having positive refractive power and separated from said fourth lens group by a third air space;
   f) wherein the zoom lens is design such that when zooming from the maximum wide-angle state to the maximum telephoto state, said first air space increases, said second air space changes and said third air changes; and
   g) wherein the following conditions are satisfied:

$$2.0 < Bf_w/Y0 < 8.0$$

$$0.03 < (D23_t - D23_w)/f_w < 0.6$$

wherein $f_w$ is the focal length of the zoom lens in the maximum wide-angle state, $Bf_w$ is the back focus in the maximum wide-angle state, $Y0$ is the maximum image height, $D23_w$ is the axial extent of said second air space in the maximum wide-angle state, and $D23_t$ is the axial extent of said second air space in the maximum telephoto state.

2. A zoom lens according to claim 1, wherein said second air space changes in a manner that is at least one of linear and non-linear, and said third air space changes in a manner that is at least one of linear and non-linear.

3. A zoom lens according to claim 1, further satisfying the following conditions:

$$0.1 < f_2/f_3 < 2.0$$

$$2.0 < |f_3|/f_w < 10.0$$

wherein $f_2$ is the focal length of said second lens group and $f_3$ is the focal length of said third lens group.

4. A zoom lens according to claim 3, wherein said first lens group and said fourth lens group are fixed during zooming from the maximum wide-angle state to the maximum telephoto state.

5. A zoom lens according to claim 4, wherein said fifth lens group includes a cemented lens having a divergent convex surface having negative power and facing imagewise.

6. A zoom lens according to claim 5, further satisfying the following condition:

$$0.3 < D23_m/f_w < 3.0$$

wherein $D23_m$ is the axial extent of said second air space in an intermediate focal length state.

7. A zoom lens according to claim 6, satisfying the following conditions:

$$0.7 < |f23_w|/f_w < 2.0$$

$$0.3 < D23_t/f_w < 1.8$$

wherein $f23_w$ is the composite focal length of said second lens group and said third lens group in the maximum wide-angle state, and $D23_t$ is the axial extent of said second air space in the maximum telephoto state.

8. A zoom lens according to claim 6, wherein:

a) said fourth lens group includes a positive lens arranged most objectwise and a negative lens arranged most imagewise, with a first d-line refractive index differential therebetween;

b) said cemented lens comprises an objectwise lens and an imagewise lens and includes a second d-line refractive index differential therebetween; and c) the mean value $\Delta N$ of said first and second d-line refractive index differentials satisfies the condition:

$$\Delta N > 0.18.$$

9. A zoom lens according to claim 1, wherein said first lens group and said fourth lens group are fixed during zooming from the maximum wide-angle state to the maximum telephoto state.

10. A zoom lens according to claim 9, wherein said fifth lens group includes a cemented lens having a divergent convex surface having negative power and facing imagewise.

11. A zoom lens according to claim 10, further satisfying the following condition:

$$0.3 < D23_m/f_w < 3.0$$

wherein $D23_m$ is the axial extent of said second air space in an intermediate focal length state.

12. A zoom lens according to claim 11, satisfying the following conditions:

$$0.7 < |f23_w|/f_w < 2.0$$

$$0.3 < D23_t/f_w < 1.8$$

wherein $f23_w$ is the composite focal length of said second lens group and said third lens group in the maximum wide-angle state, and $D23_t$ is the axial extent of said second air space in the maximum telephoto state.

13. A zoom lens according to claim 11, wherein:

a) said fourth lens group includes a positive lens arranged most objectwise and a negative lens arranged most imagewise and a first d-line refractive index differential therebetween;

b) said cemented lens comprises an objectwise lens and imagewise lens and includes a second d-line refractive index differential therebetween; and c) the mean value $\Delta N$ of said first and second d-line refractive index differentials satisfies the condition:

$$\Delta N > 0.18.$$

14. A zoom lens having the elements and characteristics as set forth in Tables 1a–d.

15. A zoom lens having the elements and characteristics as set forth in Tables 2a–c.

* * * * *

UNITED STATES PATENT AND TRADEMARK OFFICE
CERTIFICATE OF CORRECTION

PATENT NO. : 5,898,525
DATED : April 27, 1999
INVENTOR(S) : Kenzaburo Suzuki, et al.

It is certified that error appears in the above-identified patent and that said Letters Patent is hereby corrected as shown below:

On the title page, after the name and address of the inventor, and before the Application No., insert - - [73] Assignee: Nikon Corporation, Tokyo, Japan - -.

In claim 1, column 14, line 64, before "changes; and" insert - -space - -.

Signed and Sealed this

Eleventh Day of July, 2000

*Attest:*

Q. TODD DICKINSON

*Attesting Officer*     *Director of Patents and Trademarks*